(12) United States Patent
Kato

(10) Patent No.: US 12,515,597 B2
(45) Date of Patent: Jan. 6, 2026

(54) MOBILE OBJECT CONTROLLER, MOBILE OBJECT CONTROL METHOD, AND RECORDING MEDIUM

(71) Applicant: HONDA MOTOR CO., LTD., Tokyo (JP)

(72) Inventor: Hisahiro Kato, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 229 days.

(21) Appl. No.: 18/533,607

(22) Filed: Dec. 8, 2023

(65) Prior Publication Data

US 2024/0278740 A1 Aug. 22, 2024

(30) Foreign Application Priority Data

Feb. 21, 2023 (JP) ................................ 2023-024954

(51) Int. Cl.
| | |
|---|---|
| *G05D 1/00* | (2024.01) |
| *B60R 16/023* | (2006.01) |
| *B60R 16/03* | (2006.01) |
| *B60R 25/24* | (2013.01) |
| *B60W 60/00* | (2020.01) |

(52) U.S. Cl.
CPC .......... *B60R 16/0231* (2013.01); *B60R 16/03* (2013.01); *B60R 25/24* (2013.01)

(58) Field of Classification Search
CPC ..... B60R 16/0231; B60R 16/03; B60R 25/24; G05B 23/0213; G05B 2219/24065
See application file for complete search history.

(56) References Cited

FOREIGN PATENT DOCUMENTS

JP 2012-126331 A 7/2012

*Primary Examiner* — Anne Marie Antonucci
*Assistant Examiner* — Jingli Wang
(74) *Attorney, Agent, or Firm* — Rankin, Hill & Clark LLP

(57) ABSTRACT

A mobile object controller includes a first ECU and a second ECU, when a mobile object is in a power-off state, the first ECU starts timekeeping for a first predetermined time period by a timekeeping section if the first ECU recognizes a predetermined operation on a power switch while identification information is not stored in a storage section, and starts communication establishment processing between the first ECU and the second ECU to establish communication between the first ECU and the second ECU so as to allow the first ECU to be operated via the second ECU by a terminal device connected to the second ECU.

10 Claims, 4 Drawing Sheets

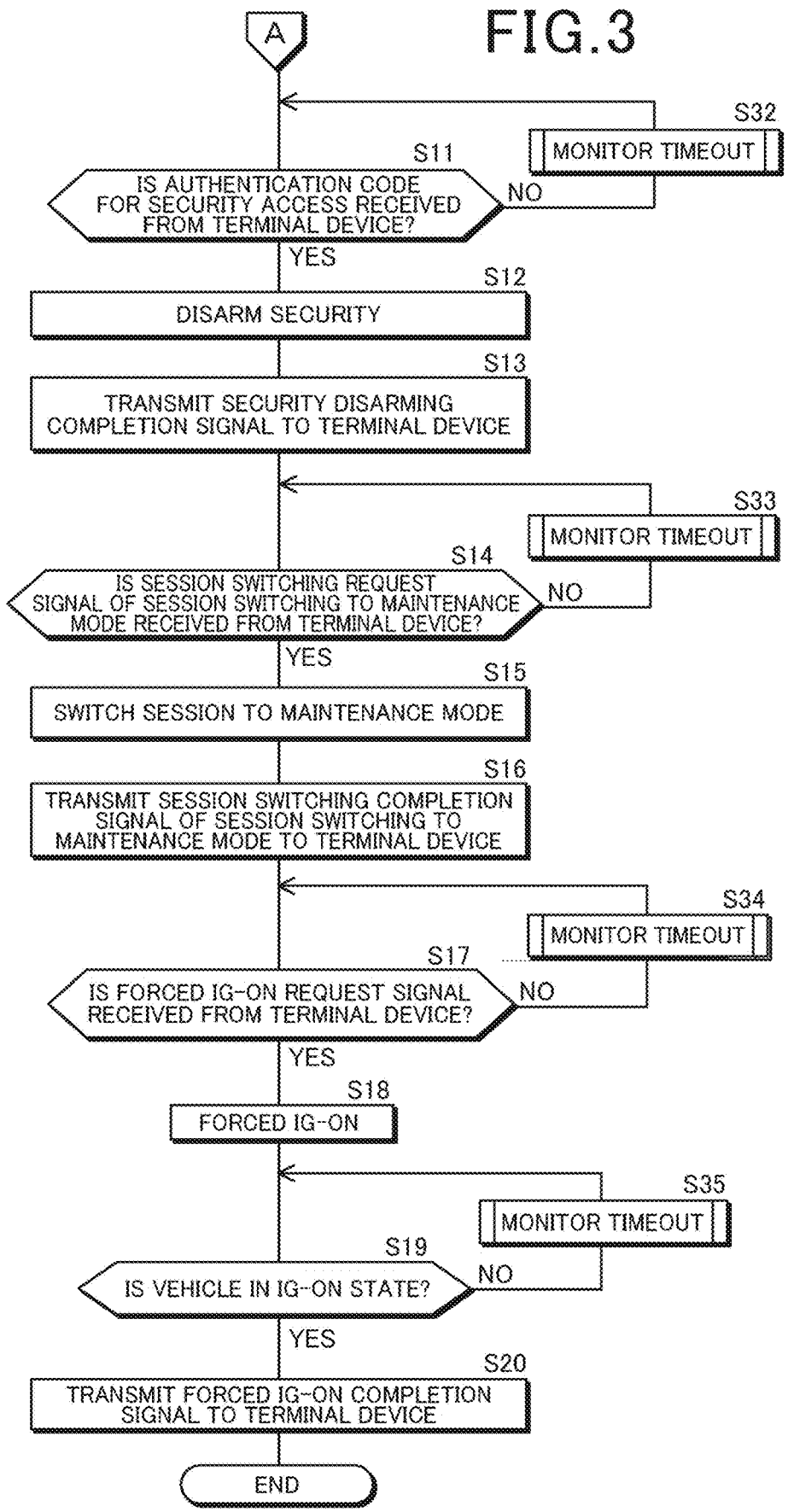

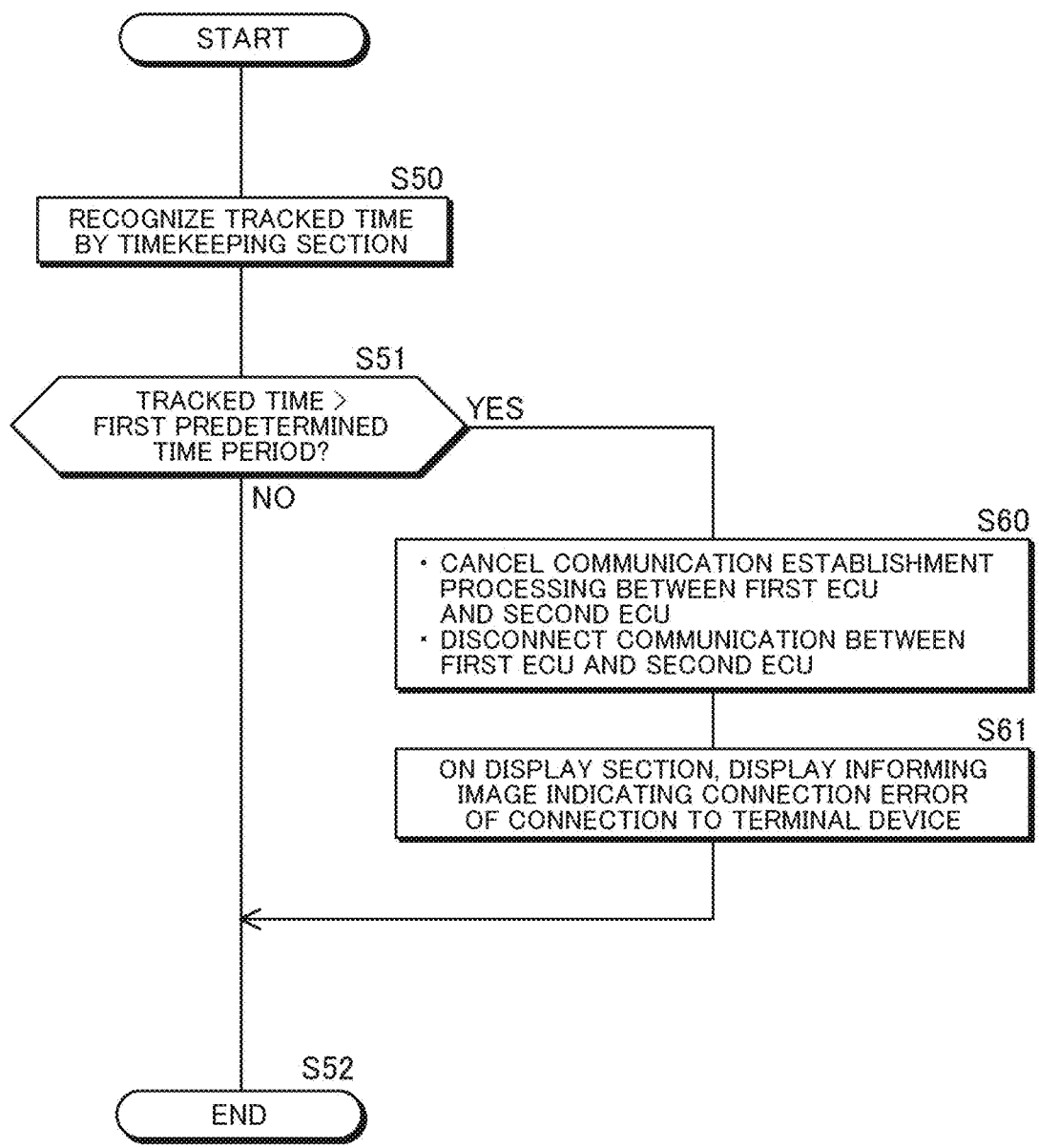

MOBILE OBJECT CONTROLLER, MOBILE OBJECT CONTROL METHOD, AND RECORDING MEDIUM

INCORPORATION BY REFERENCE

The present application claims priority under 35 U.S.C. § 119 to Japanese Patent Application No. 2023-024954 filed on Feb. 21, 2023. The content of the application is incorporated herein by reference in its entirety.

BACKGROUND OF THE INVENTION

Field of the Invention

The present invention relates to a mobile object controller, a mobile object control method, and a recording medium.

Description of the Related Art

In conventional failure diagnosis systems for vehicles, there is known a technique that, in the case in which vehicles are still to be delivered and the identification numbers of the vehicles are not yet stored in the vehicles, failure diagnoses are performed under different conditions from those in normal failure modes for the case in which the identification numbers of vehicles are already stored in the vehicles (see Japanese Patent Laid-Open No. 2012-126331, for example).

When a vehicle is on delivery, processing of storing identification information on a vehicle key in the vehicle is performed in order to associate the vehicle key with the vehicle and make the vehicle usable only with the dedicated vehicle key. When the user enters the vehicle, authentication is performed on a vehicle key owned by a user based on the identification information stored in the vehicle, and when the authentication is succeeded, the user is allowed to lock and unlock the vehicle and start up the power supply of the vehicle. Such a so-called smart entry system has been popular.

In the configuration with such a smart entry system being enabled, in the state in which the identification information on the vehicle key is not yet stored in the vehicle before the vehicle is delivered, the power supply of the vehicle cannot be started up by operating the power switch. Hence, a vehicle that is still to be delivered suffers from a drawback in that a user cannot start up the power supply of the vehicle by operating the power switch and store the identification information on the vehicle key or perform a vehicle diagnosis for improvement of traffic safety, etc. It may be conceivable to add a dedicated component that enables start-up of the power supply of the vehicle without operating the power switch, to the vehicle; however, this might cause increase in cost, which is not preferable. In addition, recent increase in the number of ECUs used in a vehicle has a tendency to make the vehicle electronic system more complex, and it is also necessary to consider arrangement of ECUs while considering security performance.

A problem to be solved by the present invention, which has been made in light of the above facts, is to enable the power supply of a mobile object to be started up while enhancing security performance with a configuration that reduces the cost in the situation in which identification information used for authentication of a user is not stored in the mobile object, such as a vehicle.

To solve the above problem, an object of the present application is to promote enhancement of safety performance of a mobile object. In addition, the present application further improves traffic safety and contributes to development of sustainable transport systems.

SUMMARY OF THE INVENTION

As a first aspect to achieve the above object, there may be a mobile object controller including: a storage section that stores identification information used for authentication of a user of a mobile object; a timekeeping section that performs timekeeping for a first predetermined time period; a first ECU to which a power switch for instruction of power-on of the mobile object is connected, the first ECU setting the mobile object into a power-on state in response to operation on the power switch when the mobile object is in a power-off state and when the authentication of the user according to the identification information stored in the storage section is succeeded; and a second ECU to which a terminal device is connectable, the second ECU communicating with the first ECU, wherein when the mobile object is in the power-off state, the first ECU starts the timekeeping for the first predetermined time period by the timekeeping section if the first ECU recognizes a predetermined operation on the power switch while the identification information is not stored in the storage section, and the first ECU starts communication establishment processing between the first ECU and the second ECU to establish communication between the first ECU and the second ECU so as to allow the first ECU to be operated via the second ECU by the terminal device connected to the second ECU.

The above mobile object controller may be configured such that, when the mobile object is in the power-off state, the second ECU accepts no operation instruction on the second ECU by the terminal device unless the communication between the first ECU and the second ECU is established by the first ECU in spite of the connection of the terminal device.

The above mobile object controller may be configured such that the predetermined operation is to operate the power switch for a second predetermined time period, and when the mobile object is in the power-off state, the first ECU starts the communication establishment processing between the first ECU and the second ECU if the first ECU recognizes that the power switch is operated for the second predetermined time period while the identification information is not stored in the storage section.

The above mobile object controller may be configured such that a direct communicating connection is disabled between the first ECU and the terminal device.

The above mobile object controller may be configured such that, if the communication between the first ECU and the second ECU is established before termination of the timekeeping for the first predetermined time period by the timekeeping section while authentication of the terminal device based on information transmitted from the terminal device is failed, the first ECU disconnects the communication between the first ECU and the second ECU, and the first ECU then prohibits an acceptance of the communication establishment between the first ECU and the second ECU in accordance with the predetermined operation on the power switch until a third predetermined time period elapses.

The above mobile object controller may be configured such that, if the communication between the first ECU and the second ECU is established before termination of the timekeeping for the first predetermined time period by the timekeeping section while the mobile object is unable to be set into the power-on state in response to reception of a forced power-on signal transmitted from the terminal device, the first ECU cancels the communication establishment processing between the first ECU and the second ECU.

The above mobile object controller may be configured such that, when the first ECU recognizes operation on an operating section included in the mobile object while the identification information is not stored in the storage section, the first ECU displays an informing image indicating the identification information is not stored in the storage section on a display section included in the mobile object.

The above mobile object controller may be configured such that, when the first ECU recognizes the predetermined operation on the power switch and starts the communication establishment processing between the first ECU and the second ECU, the first ECU displays, on a display section included in the mobile object, an informing image indicating that the communication establishment processing between the first ECU and the second ECU is started.

As a second aspect to achieve the above object, there may be a mobile object control method executed by a mobile object controller including: a storage section that stores identification information used for authentication of a user of a mobile object; a timekeeping section that performs timekeeping for a first predetermined time period; a first ECU to which a power switch for instruction of power-on of the mobile object is connected; and a second ECU to which a terminal device is connectable, the second ECU communicating with the first ECU, the mobile object control method including: a normal operation corresponding step of allowing the first ECU to set the mobile object into a power-on state in response to operation on the power switch when the mobile object is in a power-off state and when the authentication of the user according to the identification information stored in the storage section is succeeded; and a maintenance corresponding step of, when the mobile object is in the power-off state, allowing the first ECU to start the timekeeping for the first predetermined time period by the timekeeping section if the first ECU recognizes a predetermined operation on the power switch while the identification information is not stored in the storage section, and to start communication establishment processing between the first ECU and the second ECU to establish communication between the first ECU and the second ECU so as to allow the first ECU to be operated via the second ECU by the terminal device connected to the second ECU.

As a third aspect to achieve the above object, there may be a non-transitory recording medium storing a program executed by a first ECU in a mobile object controller that includes: a storage section that stores identification information used for authentication of a user of a mobile object; a timekeeping section that performs timekeeping for a first predetermined time period; the first ECU to which a power switch for instruction of power-on of the mobile object is connected; and a second ECU to which a terminal device is connectable, the second ECU communicating with the first ECU, the program causing the first ECU to execute: a normal operation corresponding processing of setting the mobile object into a power-on state in response to operation on the power switch when the mobile object is in a power-off state and when the authentication of the user according to the identification information stored in the storage section is succeeded; and a maintenance corresponding processing of, when the mobile object is in the power-off state, starting the timekeeping for the first predetermined time period by the timekeeping section if the first ECU recognizes a predetermined operation on the power switch while the identification information is not stored in the storage section, and starting communication establishment processing between the first ECU and the second ECU to establish communication between the first ECU and the second ECU so as to allow the first ECU to be operated via the second ECU by the terminal device connected to the second ECU.

According to the above-described mobile object controller, mobile object control method, and recording medium, only with simple processing of applying the predetermined operation on the power switch, it is possible to start the communication establishment processing between the first ECU and the second ECU and also to recognize the progress of the communication establishment processing by using the tracked time obtained by the timekeeping section. Accordingly, in the case in which the identification information used for authentication of the user is not stored in the mobile object, it is possible to start up the power supply of the mobile object while enhancing the security performance with the configuration that reduces the cost.

BRIEF DESCRIPTION OF THE DRAWINGS

FIG. 3 is a second flowchart of the communication establishment processing with the terminal device performed by the first ECU; and FIG. 4 is a third flowchart of the communication establishment processing with the terminal device performed by the first ECU.

DETAILED DESCRIPTION OF THE PREFERRED EMBODIMENTS

1. Configuration of Mobile Object Controller

Figure 1:
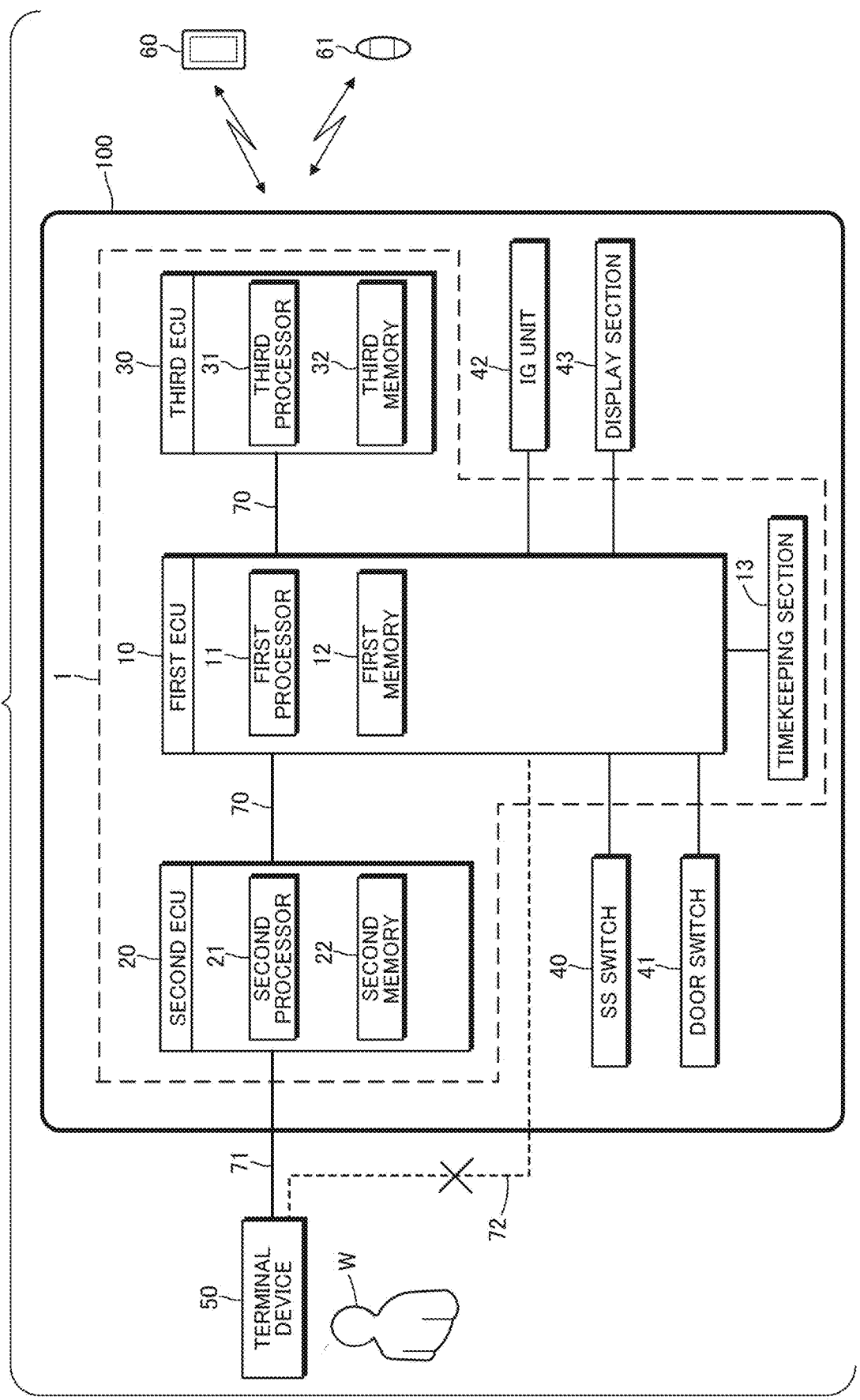
FIG. 1 is a configuration diagram of a mobile object controller.

The configuration of a mobile object controller 1 will be described with reference to FIG. 1. The mobile object controller 1 of the present embodiment is installed in a vehicle 100 (corresponding to a mobile object of the present disclosure) and controls the operation of the vehicle 100. The mobile object controller 1 includes a plurality of ECUs (electronic control units) 10, 20, 30 and a timekeeping section 13. The timekeeping section 13 tracks the setting time in order to monitor the timeout of processing of concern. Note that it may be configured to include the timekeeping section 13 in the first ECU 10 as a function of the first ECU 10.

The first ECU 10 is a control unit including: a first processor 11; a first memory 12; and others, and executes a program stored in the first memory 12 to perform control on an area including the periphery of a driver's seat of the vehicle 100, control on power-on and power-off of the vehicle 100, etc.

A start-stop switch 40 (hereinafter referred to as an SS switch 40, which corresponds to a power switch in the present disclosure) that instructs power-on and power-off of the vehicle 100, a door switch 41 that detects open/close of a door of the vehicle 100, an IG (ignition) unit 42 that performs switching between power-on and power-off of the vehicle 100, and a display section 43 are connected to the first ECU 10. The display section 43 may be, for example, a flat panel display, such as a liquid crystal display or an organic EL display.

The second ECU 20 is a control unit including: a second processor 21; a second memory 22; and others, and controls overall operation of the vehicle 100 by executing programs stored in the second memory 22. The second ECU 20 is connected to the first ECU 10 via a first CAN (controller area network) 70, and a terminal device 50 for maintenance of the vehicle 100 is detachably connected to the second ECU 20 via a second CAN 71. An operator W connects the terminal device 50 to the second ECU 20 to perform a maintenance work, etc., at the time of delivering the vehicle 100. The terminal device 50 is a notebook PC (personal computer), a tablet PC, or the like.

The third ECU 30 is a control unit including: a third processor 31; a third memory 32; and others, and performs authentication processing of a user of the vehicle 100 by executing a program stored in the third memory 32. Specifically, the third ECU 30 collates identification information transmitted from a mobile key 61, a mobile terminal 60 (more specifically, a virtual key application executed on the mobile terminal 60) owned by the user with identification information stored in the third memory 32 and thereby to authenticate the user. The mobile terminal 60 may be, for example, a communication terminal, such as a smartphone, a mobile phone, or a tablet terminal.

The authentication processing of the user may be performed by using biometric information (fingerprints, irises, facial images, etc.,) of the user as the identification information on the user. When the vehicle 100 is on delivery, the identification information is transmitted from the terminal device 50 to the third ECU 30 through operation on the terminal device 50 executed by the operator W, and is stored in the third memory 32 (corresponding to a storage section in the present disclosure). The third ECU 30 is connected to the first ECU 10 via the first CAN 70. In addition, the programs stored in the first memory 12, the second memory 22, and the third memory 32 may be read from a recording medium (e.g., an optical disk, a flash memory) by the mobile object controller 1 and stored in respective memories, and may be downloaded from an external server (not shown) or the like and stored in the respective memories.

When the first ECU 10 recognizes the operation on the SS switch 40 in a state in which the authentication of the mobile terminal 60 or the mobile key 61 is succeeded by the third ECU 30, the first ECU 10 sets the vehicle 100 into a power-on state by the IG unit 42. In this case, when the vehicle is in the power-off state, the first ECU 10, the second ECU 20, and the third ECU 30 are each in a sleep state in which the power consumption is reduced to be lower than that in an active state (normal in-operation state). Note that, in order to recognize a user operation to use the vehicle 100, the authentication processing of the mobile terminal 60 or the mobile key 61 executed by the third ECU 30, the recognition processing of the operation on the SS switch 40 executed by the first ECU 10, the recognition processing of open/close of the door executed by the door switch 41, and the image displaying processing by the display section 43 are executed even in the sleep state.

Therefore, in the power-off state, the communication between the first ECU 10 and the second ECU 20 is disabled; and even if the terminal device 50 is connected to the second ECU 20, no communication can be made between the terminal device 50 and the first ECU 10 via the second ECU 20. It may be conceivable to add a wiring system 72 that directly connects the terminal device 50 and the first ECU 10; however, this solution might cause increase in cost due to addition of the wiring system 72. To cope with this, the first ECU 10 performs processing of enabling communication between the terminal device 50 and the first ECU 10 even if the identification information is not yet stored in the third memory 32 before the vehicle 100 is delivered, for example. This processing will be described, hereinafter.

2. Communication Establishment Processing Between Terminal Device and First ECU

Figure 2:
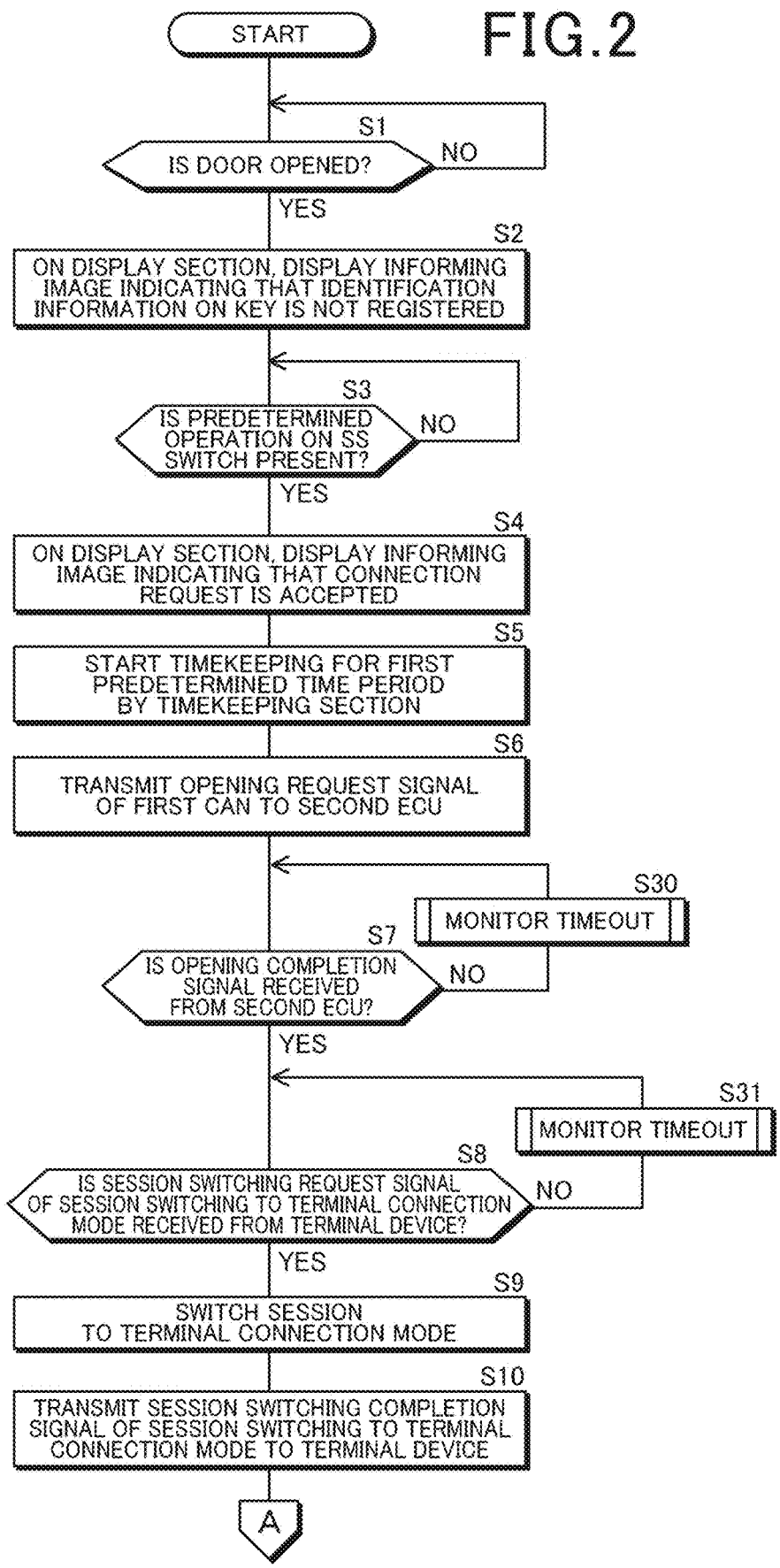
FIG. 2 is a first flowchart of communication establishment processing with a terminal device performed by a first ECU.

With reference to flowcharts shown in FIGS. 2 to 4, description will be provided on the processing of establishing the communication between the terminal device 50 and the first ECU 10 via the second ECU 20, the processing being executed by the first ECU 10 and thereby to enable the maintenance operation on the vehicle 100 by using the terminal device 50. The processing in accordance with the flowcharts shown in FIGS. 2 to 4 is executed at the stage where the vehicle 100 is shipped from a factory and when the vehicle 100 is in the power-off state while the identification information for the authentication of the mobile key 61 or the mobile terminal 60 is not yet stored in the third memory 32.

In step S1 of FIG. 2, when the first ECU 10 recognizes that the door of the vehicle 100 is opened based on a detection signal from the door switch 41, the first ECU 10 advances the process to step S2. In this case, the door having the door switch 41 corresponds to an operating section included in the mobile object of the present disclosure. The operating section included in the mobile object of the present disclosure may be whatever that recognizes the user operation of the vehicle 100, and may be configured such that the third ECU 30 receives a start-up request signal transmitted in response to a trunk or a tailgate of the vehicle 100, which is equipped with an open/close switch, or the user operation on the mobile key 61 or the mobile terminal 60.

In step S2, on the display section 43, the first ECU 10 displays an informing image indicating that the identification information on the key (virtual key application of the mobile key 61 or the mobile terminal 60) is not registered in the vehicle 100 (that is, the identification information is not stored in the third memory 32). This informing image allows the operator W, who has opened the door and got in the vehicle 100, to easily recognize that the identification information on the key is unregistered.

In the following step S3, the first ECU 10 determines whether or not long-press operation on the SS switch 40 is present; and when recognizing the long-press operation on the SS switch 40, the first ECU 10 advances the process to step S4. In this case, when the press operation on the SS switch 40 continues for a second predetermined time period (e.g., for 0.2 seconds), the first ECU 10 recognizes this press operation on the SS switch as the long-press operation on the SS switch 40. In the next step S4, the informing image indicating that a connection request of the terminal device 50 is accepted is displayed on the display section 43. This informing image allows the operator W to recognize that the connection request made by the long-press operation on the SS switch 40 is accepted, thereby improving workability of preparation for the maintenance of the vehicle 100 by the terminal device 50.

In the following step S5, the first ECU 10 starts timekeeping for a first predetermined time period (set to 30 seconds, for example) executed by the timekeeping section 13. In step S6, the first ECU 10 transmits an opening request signal of the first CAN 70 to the second ECU 20. In the following steps S7, S30, while monitoring the timeout in step S30, in step S7, the first ECU 10 determines whether or not an opening completion signal of the first CAN 70 transmitted from the second ECU 20 is received.

At this time, the monitoring processing of the timeout is executed in accordance with the flowchart shown in FIG. 4. In step S50 of FIG. 4, the first ECU 10 recognizes a tracked time at a current time point (time elapsed from a time point when the timekeeping is started in step S5) by the timekeeping section 13. In the following step S51, the first ECU 10 advances the process to step S60 when the tracked time at the current time point tracked by the timekeeping section 13 is more than a first predetermined time period; and when this tracked time is equal to or less than the first predetermined time period, the first ECU 10 advances the process to step S52, and then terminates the monitoring processing of the timeout.

In step S60, the first ECU 10 cancels the communication establishment processing when the communication between the first ECU 10 and the second ECU 20 via the first CAN 70 is not yet established. On the other hand, when the communication between the first ECU 10 and the second ECU 20 via the first CAN 70 is already established, the first ECU 10 disconnects the communication between the first ECU 10 and the second ECU 20 via the first CAN 70. In the subsequent step S61, the first ECU 10 displays an informing image indicating a connection error with the terminal device 50 on the display section 43 and advances the process to step S52.

Returning to the flowchart in FIG. 2, in step S7, when receiving the opening completion signal from the second ECU 20 and recognizing that the communication between the first ECU 10 and the second ECU 20 via the first CAN 70 is established, the first ECU 10 advances the process to step S8. In steps S8, S31, while monitoring the timeout in step S31, in step S8, the first ECU 10 determines whether or not a session switching request signal of session switching to a terminal connection mode transmitted from the terminal device 50 is received.

In step S8, when receiving the session switching request signal of the session switching to the terminal connection mode from the terminal device 50, the first ECU 10 advances the process to step S9 and executes the session switching processing to the terminal connection mode, which enables acceptance of an operation instruction from the terminal device 50. In the following step S10, the first ECU 10 transmits to the terminal device 50 a session switching completion signal of the session switching to the terminal connection mode.

In the following steps S11, S32 of FIG. 3, while monitoring the timeout in step S32, the first ECU 10 determines whether or not an authentication code for a security access is received from the terminal device 50 in step S11. When receiving the authentication code coinciding with an authentication code for maintenance connection that is previously stored in the first memory 12, from the terminal device 50, the first ECU 10 advances the process to step S12 and disarms the security to allow the maintenance operation on the mobile object 100 by the terminal device 50. In the subsequent step S13, the first ECU 10 transmits a security disarming completion signal to the terminal device 50.

In this case, when the communication between the first ECU 10 and the second ECU 20 is disconnected due to the timeout determination based on the timeout monitoring in step S32, until a third predetermined time period (e.g., for several tens of minutes to several hours) elapses, the communication establishment between the first ECU 10 and the second ECU 20 for connecting the terminal device 50 requested by the long-press operation on the SS switch 40 may be prevented from being accepted.

In the subsequent steps S14, S33, while performing the timeout monitoring in step S33, in step S14, the first ECU 10 determines whether or not the session switching request signal of the session switching to the maintenance mode transmitted from the terminal device 50 is received. When receiving the session switching request signal from the terminal device 50, the first ECU 10 advances the process to step S14 and switches the session to the maintenance mode.

In the subsequent step S16, to the terminal device 50, the first ECU 10 transmits a session switching completion signal of session switching to the maintenance mode. In the next steps S17, S34, while performing the timeout monitoring in step S34, in step S17, the first ECU 10 determines whether or not a forced IG-on request signal transmitted from the terminal device 50 is received.

The first ECU 10 advances the process to step S18 when receiving the forced IG-on request signal from the terminal device 50 and performs the forced IG-on processing to set the vehicle 100 into the power-on state (IG-on state). In the next steps S19, S35, while performing the timeout monitoring in step S35, in step S19, the first ECU 10 determines whether or not the vehicle 100 is in the IG-on state through the forced IG-on processing.

Before recognizing in step S19 that the vehicle 100 is in the IG-on state, when the tracked time at the current time point tracked by the timekeeping section 13 exceeds the first predetermined time period through the timeout monitoring in step S35, the first ECU 10 disconnects the communication between the first ECU 10 and the second ECU 20. In the flowcharts in FIGS. 2, 3, the timeout monitoring is performed in each determination process in steps S7, S8 of FIG. 2 and steps S11, S14, S17, S19 of FIG. 3; and alternatively, the timeout monitoring may be performed only in S19 for finally determining that the vehicle 100 is in the IG-on state, and the first ECU 10 may cancel the communication establishment processing between the first ECU 10 and the second ECU 20 when the tracked time at the current time point tracked by the timekeeping section 13 exceeds the first predetermined time period.

The first ECU 10 advances the process to step S20 when the vehicle 100 is in the IG-on state in step S19. In step S20, the first ECU 10 transmits a forced IG-on completion signal to the terminal device 50. Accordingly, the operator W can perform various maintenance processing on the vehicle 100 set in the power-on state by operating the terminal device 50. For example, the operator W can register the identification information on the key in the vehicle 100 by operating the terminal device 50.

Note that when the vehicle 100 is in the power-off state, the first ECU 10 sets the vehicle 100 into the power-on state in accordance with the operation on the SS switch 40 if the authentication of the user according to the identification information on the key stored in the third memory 32 is succeeded; and this processing corresponds to a normal operation corresponding step in the mobile object control method of the present disclosure and corresponds to normal operation corresponding processing in the program of the present disclosure.

Further, when the vehicle 100 is in the power-off state and the first ECU 10 recognizes the long-press operation on the SS switch 40 while the identification information on the key is not stored in the third memory 32, the first ECU 10 starts the timekeeping for the first predetermined time period by the timekeeping section 13 and starts the communication establishment processing between the first ECU 10 and the second ECU 20 and thereby to establish the communication between the first ECU 10 and the second ECU 20 to allow the first ECU 10 to be operated via the second ECU 20 by using the terminal device 50 connected to the second ECU 20; and this processing corresponds to a maintenance corresponding step in the mobile object control method of the present disclosure and also corresponds to maintenance corresponding processing in the program of the present disclosure.

3. Other Embodiments

In the above embodiment, a vehicle (including various types of vehicles, such as a four-wheeled vehicle, a two-wheeled vehicle, a vehicle driven by an internal combustion engine, and an electric vehicle) is exemplified as the mobile object; however, the mobile object controller and the mobile object control method of the present disclosure are also applicable to other types of mobile objects, such as aircrafts and ships.

In the above embodiment, as the predetermined operation on the SS switch 40 (the power switch of the present disclosure), the long-press operation of continuously operating the SS switch 40 for the predetermined time period or more is exemplified; however, the predetermined operation may be in other operation modes, for example, operation on the SS switch 40 executed several times within a predetermined time period.

In order to facilitate understanding of the invention of the present application, FIG. 1 is a schematic diagram showing the configuration of the mobile object controller 1 divided by the major processing contents, and the mobile object controller 1 may also be divided by other contents. In addition, the processing of each configuration element may be executed by one hardware unit or by a plurality of hardware units. Furthermore, the processing by each configuration element shown in FIGS. 2 to 4 may be executed by one program or by a plurality of programs.

4. Configurations Supported by the Above Embodiments

The above embodiments are specific examples of the following configurations.

(Configuration 1) A mobile object controller including: a storage section that stores identification information used for authentication of a user of a mobile object; a timekeeping section that performs timekeeping for a first predetermined time period; a first ECU to which a power switch for instruction of power-on of the mobile object is connected, the first ECU setting the mobile object into a power-on state in response to operation on the power switch when the mobile object is in a power-off state and when the authentication of the user according to the identification information stored in the storage section is succeeded; and a second ECU to which a terminal device is connectable, the second ECU communicating with the first ECU, wherein when the mobile object is in the power-off state, the first ECU starts the timekeeping for the first predetermined time period by the timekeeping section if the first ECU recognizes a predetermined operation on the power switch while the identification information is not stored in the storage section, and the first ECU starts communication establishment processing between the first ECU and the second ECU to establish communication between the first ECU and the second ECU so as to allow the first ECU to be operated via the second ECU by the terminal device connected to the second ECU.

According to the mobile object controller of Configuration 1, it is possible to start the communication establishment processing between the first ECU and the second ECU by the simple processing of performing the predetermined operation on the power switch, and also possible to recognize the progress of the communication establishment processing with the tracked time obtained by the timekeeping section. Therefore, in the mobile object in the state in which the identification information used for the authentication of the user is not stored, the power supply of the mobile object can be started up while the security performance is enhanced with the configuration that reduces the cost.

(Configuration 2) The mobile object controller according to Configuration 1, wherein when the mobile object is in the power-off state, the second ECU accepts no operation instruction on the second ECU by the terminal device unless the communication between the first ECU and the second ECU is established by the first ECU in spite of the connection of the terminal device.

According to the mobile object controller of Configuration 2, unless communication between the first ECU and the second ECU is established in accordance with the predetermined operation on the power switch, even if the terminal device is connected to the second ECU, the first ECU cannot be operated by the terminal device; therefore, the security against unauthorized manipulation on the mobile object controller by the terminal device can be enhanced.

(Configuration 3) The mobile object controller according to Configuration 1 or 2, wherein the predetermined operation is to operate the power switch for a second predetermined time period, and when the mobile object is in the power-off state, the first ECU starts the communication establishment processing between the first ECU and the second ECU if the first ECU recognizes that the power switch is operated for the second predetermined time period while the identification information is not stored in the storage section.

According to the mobile object controller of Configuration 3, on condition that the power switch is continuously operated, the communication establishment processing between the first ECU and the second ECU is executed and thereby to promote enhancement of reliability in performing maintenance by the terminal device.

(Configuration 4) The mobile object controller according to any one of Configurations 1 to 3, wherein a direct communicating connection is disabled between the first ECU and the terminal device.

Configuration 4, the configuration of directly connecting the first ECU and the terminal device is eliminated and thereby to promote cost reduction and prevent unauthorized connection to the first ECU by the terminal device.

(Configuration 5) The mobile object controller according to any one of Configurations 1 to 4, wherein if the communication between the first ECU and the second ECU is established before termination of the timekeeping for the first predetermined time period by the timekeeping section while authentication of the terminal device based on information transmitted from the terminal device is failed, the first ECU disconnects the communication between the first ECU and the second ECU, and the first ECU then prohibits an acceptance of the communication establishment between the first ECU and the second ECU in accordance with the predetermined operation on the power switch until a third predetermined time period elapses.

According to the mobile object controller of Configuration 5, it is possible to prevent a terminal device other than the terminal device that is registered in advance in the mobile object controller from being illegally connected to the mobile object controller.

(Configuration 6) The mobile object controller according to any one of Configurations 1 to 5, wherein if the communication between the first ECU and the second ECU is established before termination of the timekeeping for the first predetermined time period by the timekeeping section while the mobile object is unable to be set into the power-on state in response to reception of a forced power-on signal transmitted from the terminal device, the first ECU cancels the communication establishment processing between the first ECU and the second ECU.

According to the mobile object controller of Configuration 6, when the mobile object cannot be set into the power-on state by operating the terminal device, the communication establishment processing between the first ECU and the second ECU is canceled and thereby to prevent unauthorized manipulation on the mobile object.

(Configuration 7) The mobile object controller according to any one of Configurations 1 to 6, wherein when the first ECU recognizes operation on an operating section included in the mobile object while the identification information is not stored in the storage section, the first ECU displays an informing image indicating the identification information is not stored in the storage section on a display section included in the mobile object.

According to the mobile object controller of Configuration 7, it is possible for the operator, who performs the maintenance of the mobile object or the like, to easily recognize that the identification information is not stored in the storage section and thereby to support implementation of the maintenance operation.

(Configuration 8) The mobile object controller according to any one of Configurations 1 to 7, wherein when the first ECU recognizes the predetermined operation on the power switch and starts the communication establishment processing between the first ECU and the second ECU, the first ECU displays, on a display section included in the mobile object, an informing image indicating that the communication establishment processing between the first ECU and the second ECU is started.

According to the mobile object controller of Configuration 8, it is possible for the operator who performs the maintenance of the mobile object or the like to easily recognize that the communication establishment instruction for the communication establishment between the first ECU and the second ECU is accepted and thereby to support implementation of the maintenance operation.

(Configuration 9) A mobile object control method executed by a mobile object controller including: a storage section that stores identification information used for authentication of a user of a mobile object; a timekeeping section that performs timekeeping for a first predetermined time period; a first ECU to which a power switch for instruction of power-on of the mobile object is connected; and a second ECU to which a terminal device is connectable, the second ECU communicating with the first ECU, the mobile object control method including: a normal operation corresponding step of allowing the first ECU to set the mobile object into a power-on state in response to operation on the power switch when the mobile object is in a power-off state and when the authentication of the user according to the identification information stored in the storage section is succeeded; and a maintenance corresponding step of, when the mobile object is in the power-off state, allowing the first ECU to start the timekeeping for the first predetermined time period by the timekeeping section if the first ECU recognizes a predetermined operation on the power switch while the identification information is not stored in the storage section, and to start communication establishment processing between the first ECU and the second ECU to establish communication between the first ECU and the second ECU so as to allow the first ECU to be operated via the second ECU by the terminal device connected to the second ECU.

By executing the mobile object control method of Configuration 9 by the first ECU, it is possible to obtain the same effect as that of the mobile object controller of Configuration 1.

(Configuration 10) A non-transitory recording medium storing a program executed by a first ECU in a mobile object controller including: a storage section that stores identification information used for authentication of a user of a mobile object; a timekeeping section that performs timekeeping for a first predetermined time period; the first ECU to which a power switch for instruction of power-on of the mobile object is connected; and a second ECU to which a terminal device is connectable, the second ECU communicating with the first ECU, the program causing the first ECU to execute: a normal operation corresponding processing of setting the mobile object into a power-on state in response to operation on the power switch when the mobile object is in a power-off state and when the authentication of the user according to the identification information stored in the storage section is succeeded; and a maintenance corresponding processing of, when the mobile object is in the power-off state, starting the timekeeping for the first predetermined time period by the timekeeping section if the first ECU recognizes a predetermined operation on the power switch while the identification information is not stored in the storage section, and starting communication establishment processing between the first ECU and the second ECU to establish communication between the first ECU and the second ECU so as to allow the first ECU to be operated via the second ECU by the terminal device connected to the second ECU.

By executing the program of Configuration 10 by the first ECU, it is possible to realize the configuration of the mobile object controller of Configuration 1.

REFERENCE SIGNS LIST 1 mobile object controller, 10 first ECU, 11 first processor, 12 first memory, 20 second ECU, 21 second processor, 22 second memory, 30 third ECU, 31 third processor, 32 third memory, 40 SS switch (power switch), 41 door switch, 42 IG unit, 43 display section, 50 terminal device, 60 mobile terminal, 61 mobile key, 100 vehicle (mobile object), W operator

What is claimed is:

1. A mobile object controller comprising:
a storage section that stores identification information used for authentication of a user of a mobile object;
a timekeeping section that performs timekeeping for a first predetermined time period;
a first ECU to which a power switch for instruction of power-on of the mobile object is connected, the first ECU setting the mobile object into a power-on state in response to operation on the power switch when the mobile object is in a power-off state and when the authentication of the user according to the identification information stored in the storage section is succeeded; and
a second ECU to which a terminal device is connectable, the second ECU communicating with the first ECU, wherein,
when the mobile object is in the power-off state, the first ECU starts the timekeeping for the first predetermined time period by the timekeeping section if the first ECU recognizes a predetermined operation on the power switch while the identification information is not stored in the storage section, and the first ECU starts communication establishment processing between the first ECU and the second ECU to establish communication between the first ECU and the second ECU so as to allow the first ECU to be operated via the second ECU by the terminal device connected to the second ECU.

2. The mobile object controller according to claim 1, wherein
when the mobile object is in the power-off state, the second ECU accepts no operation instruction on the second ECU by the terminal device unless the communication between the first ECU and the second ECU is established by the first ECU in spite of the connection of the terminal device.

3. The mobile object controller according to claim 1, wherein
the predetermined operation is to operate the power switch for a second predetermined time period, and
when the mobile object is in the power-off state, the first ECU starts the communication establishment processing between the first ECU and the second ECU if the first ECU recognizes that the power switch is operated for the second predetermined time period while the identification information is not stored in the storage section.

4. The mobile object controller according to claim 1, wherein
a direct communicating connection is disabled between the first ECU and the terminal device.

5. The mobile object controller according to claim 1, wherein
if the communication between the first ECU and the second ECU is established before termination of the timekeeping for the first predetermined time period by the timekeeping section while authentication of the terminal device based on information transmitted from the terminal device is failed, the first ECU disconnects the communication between the first ECU and the second ECU, and the first ECU then prohibits an acceptance of the communication establishment between the first ECU and the second ECU in accordance with the predetermined operation on the power switch until a third predetermined time period elapses.

6. The mobile object controller according to claim 1, wherein
if the communication between the first ECU and the second ECU is established before termination of the timekeeping for the first predetermined time period by the timekeeping section while the mobile object is unable to be set into the power-on state in response to reception of a forced power-on signal transmitted from the terminal device, the first ECU cancels the communication establishment processing between the first ECU and the second ECU.

7. The mobile object controller according to claim 1, wherein
when the first ECU recognizes operation on an operating section included in the mobile object while the identification information is not stored in the storage section, the first ECU displays an informing image indicating the identification information is not stored in the storage section on a display section included in the mobile object.

8. The mobile object controller according to claim 1, wherein
when the first ECU recognizes the predetermined operation on the power switch and starts the communication establishment processing between the first ECU and the second ECU, the first ECU displays, on a display section included in the mobile object, an informing image indicating that the communication establishment processing between the first ECU and the second ECU is started.

9. A mobile object control method executed by a mobile object controller including: a storage section that stores identification information used for authentication of a user of a mobile object; a timekeeping section that performs timekeeping for a first predetermined time period; a first ECU to which a power switch for instruction of power-on of the mobile object is connected; and a second ECU to which a terminal device is connectable, the second ECU communicating with the first ECU,
the mobile object control method comprising:
a normal operation corresponding step of allowing the first ECU to set the mobile object into a power-on state in response to operation on the power switch when the mobile object is in a power-off state and when the authentication of the user according to the identification information stored in the storage section is succeeded; and
a maintenance corresponding step of, when the mobile object is in the power-off state, allowing the first ECU to start the timekeeping for the first predetermined time period by the timekeeping section if the first ECU recognizes a predetermined operation on the power switch while the identification information is not stored in the storage section, and to start communication establishment processing between the first ECU and the second ECU to establish communication between the first ECU and the second ECU so as to allow the first ECU to be operated via the second ECU by the terminal device connected to the second ECU.

10. A non-transitory recording medium storing a program executed by a first ECU in a mobile object controller including: a storage section that stores identification information used for authentication of a user of a mobile object; a timekeeping section that performs timekeeping for a first predetermined time period; the first ECU to which a power switch for instruction of power-on of the mobile object is connected; and a second ECU to which a terminal device is connectable, the second ECU communicating with the first ECU,
the program causing the first ECU to execute:
a normal operation corresponding processing of setting the mobile object into a power-on state in response to operation on the power switch when the mobile object is in a power-off state and when the authentication of the user according to the identification information stored in the storage section is succeeded; and
a maintenance corresponding processing of, when the mobile object is in the power-off state, starting the timekeeping for the first predetermined time period by the timekeeping section if the first ECU recognizes a predetermined operation on the power switch while the identification information is not stored in the storage section, and starting communication establishment processing between the first ECU and the second ECU to establish communication between the first ECU and the second ECU so as to allow the first ECU to be operated via the second ECU by the terminal device connected to the second ECU.

* * * * *